United States Patent [19]

Kappner

[11] Patent Number: 4,809,342
[45] Date of Patent: Feb. 28, 1989

[54] PROCESS AND ARRANGEMENTS FOR THE INDENTIFICATION MARKING AND RECOGNITION OF OBJECTS

[76] Inventor: Helmut A. Kappner, Akazienweg 13,, 6720 Speyer/Rhein, Fed. Rep. of Germany

[21] Appl. No.: 890,853
[22] PCT Filed: Nov. 27, 1985
[86] PCT No.: PCT/EP85/00648
    § 371 Date: Jul. 21, 1986
    § 102(e) Date: Jul. 21, 1986
[87] PCT Pub. No.: WO86/03314
    PCT Pub. Date: Jun. 5, 1986

[30] Foreign Application Priority Data

Nov. 27, 1984 [DE] Fed. Rep. of Germany ....... 3443086
Feb. 22, 1985 [DE] Fed. Rep. of Germany ....... 3506175

[51] Int. Cl.$^4$ .............................................. G06K 9/18
[52] U.S. Cl. ........................................... 382/11; 382/8; 382/32; 358/107; 356/401; 235/464
[58] Field of Search ............... 235/385, 435, 436, 448, 235/454, 464, 467, 490; 356/372, 375, 389, 392, 393, 399, 401; 358/101, 107; 364/516, 200, 900; 362/1, 8, 11, 12, 14, 25, 27, 30, 32, 33, 34, 48, 49, 61, 63, 65, 69

[56] References Cited

U.S. PATENT DOCUMENTS 3,938,186  2/1976  Destame ................................ 382/11
4,114,797 11/1978  Himmel ............................... 235/467
4,193,540  3/1980  Dougados et al. .................... 235/454
4,543,660  9/1985  Maeda ................................. 382/41

FOREIGN PATENT DOCUMENTS 1219251  1/1971  United Kingdom ............. 235/382.5

OTHER PUBLICATIONS

Kala, Mohan S., "Man and Machine Compatible Alpha-numeric and Metrological System (Fondijyal) for National and International Use", Medical Research Council Research Disclosure Aug. 1973, London, pp. 4–5.
Electronic Engineering, vol. 83, No. 403, Sept. 1961, "A Fast Numeral Reading Machine".

Primary Examiner—Leo H. Boudreau
Assistant Examiner—Jose L. Couso
Attorney, Agent, or Firm—Foley & Lardner, Schwartz, Jeffery, Schwaab, Mack, Blumenthal & Evans

[57] ABSTRACT

In a method for identifying objects, in particular documents, production pieces and transport means, on which a permanent coding is applied which consists of segmented character symbols (30 to 36) which can be read both by humans and machines, further orientation symbols (24, 25) are applied to the object, these having a given position for coding. The coding (23) and the orientation symbols (24, 25) are recorded by an electronic camera, the output signals of which are passed to an image-processing computer (14). Scanning masks (30, 31) are produced which receive the anticipated position of the orientation symbols (24, 25) within the image recorded and the area of which extends beyond that of the orientation symbols (24, 25). Those symbols which are located in the masks (30, 31) are identified as orientation symbols (24, 25) and the coordinates of them calculated. In this way the precise position of the coding (23) is determined and further masks (44) scan the coding (23). The invention covers in addition arrangements for the application of the method according to the invention and methods and arrangements for identifying the objects.

8 Claims, 10 Drawing Sheets

PROCESS AND ARRANGEMENTS FOR THE INDENTIFICATION MARKING AND RECOGNITION OF OBJECTS

TECHNICAL FIELD

The invention proceeds from a method of identifying an object by applying a coded mark to the object.

It is necessary in various fields to identify previously labelled objects. For example, transport containers are provided with a distinguishing marking, from which, among other things, the owner and the time of being put into use can be seen. It is thus possible in the beverage industry to follow the course of empty containers.

In addition, an identification and appropriate control of production parts is necessary in the industrial sector. It is often not sufficiently reliable to have activities of this kind carried out by humans. With monotonous work of this kind there is a considerable decrease in the attentiveness of the persons involved. Furthermore, the carrying out of such activities by persons entails considerable costs.

STATE OF THE ART

Many methods and devices for the identification of objects have therefore been disclosed which are based on the mechanical identification of codes.

Of these, optical scanning methods have the advantage of being able to vary the distance between the reading unit and the object to be identified.

However, problems arise when the location of the coding in relation to the optical sensor does not correspond precisely to a given position or when, in rough industrial use, the coding is partially altered by mechanical action or dirt.

For these reasons character codings are up to the present little known in the industrial material flow, with the exception of reading devices for reading postcodes on letters and labels.

The correlation methods of the prior art for the identification of symbols are too sensitive to incorrect positioning, and in particular differences in rotary position and adverse effects of the shape of the symbols such as cannot be prevented in industrial operation. IN addition there is the fact that the methods of character-reading of the prior art entail considerable technical complication.

For this reason, therefore, it is predominantly bar codes that are used in industrial processes, in the case of which it is possible to find the position of the coding by means of the characteristic sequence of the bars, while there is also a certain tolerance for damage, or else quite rough codings in the form of perforations or raised bars are used, which, however, can be interpreted by a human being only with difficulty.

The use of orientational symbols in image-processing is in itself known. In methods of the prior art (DE 32 05 189 A1), however, special orientational symbols are provided for, which, on account of their special form, are identified as such on evaluation. This process, however, may be disrupted by defects in the orientational symbols, for example through mechanical damage, so that the orientational symbols are not identified. This particularly disrupts the identification process, since the identification of the orientational symbols is located at the start of the entire procedure. In the method according to the invention no specially formed orientational symbols are necessary. They may, for example, be in the form of small rectangles, bars or circular discs or of any other geometrical shape. Excavations, partial coverings or flaws in the symbols or orientational symbols also do not have any adverse effect on the function of the method according to the invention within wide tolerances.

SUMMARY OF THE INVENTION

The method according to the invention with the characterizing features of the main claim has the advantage that coding which can be read by both humans and machines can be identified with a low rate of errors and that deviations in the position of the coding and arbitrary rotational positions can be identified with relatively little technical complication and thus have no adverse effect on the identification process. In addition, it offers the advantage that the code symbols and orientation symbols can still be satisfactorily read even when partially damaged.

In particular character symbols easily readable by humans can now also be applied permanently to production pieces and containers, etc., by utilizing property of the segmented representation as explained in the claims, and these symbols can at the same time be read mechanically by the method according to the invention.

In the field of image-processing the term "mask" is generally used to mean an image segment scanning pattern or image section which is used for the selection of relevant and irrelevant sections of the image. A mask may assume various forms and be, among other things, circular or rectangular in shape. On the evaluation of signals in real time which are produced by a video camera a mask is represented, for example, by pulses which occur in predetermined lines, in each case for a predetermined section of the line. Such pulses, together with the video signal which is transformed into a binary signal are passed to a coincidence circuit. At the output of the coincidence circuit only those signals which correspond to the parts of the symbol to be identified which are located inside the mask are available.

On the implementation of corresponding methods with the assistance of computer techniques, addresses will be conveniently assigned, within a previously stored camera image, to the individual image elements (image points), and only in the case of those addresses which are stored as masks will the image content be scanned for the presence of symbols. In this case it is generally immaterial to the desired effect whether each individual address associated with a mask, or only a few values and an associated mathematical algorithm, is stored. For example, for a rectangular mask the corner points can be stored, and when the mask is in use, the only points scanned are those of which the coordinates lie between the corner points, or in the case of a circular mask, the centre-point and the radius are stored.

It is thus possible, for example, by means of the method according to the invention to deliver the objects to the identification device by conventional transport means, such as roller conveyors and circular conveyors, and, despite the inaccuracies of these devices, to identify the objects with a low error rate.

A further development of the method according to the invention lies in providing, for the identification of rotationally symmetrical objects, before the creation of the masks for the orientational symbols, a first mask for the centre-point marked on the object and a second mask for an angular-position symbol of the object. The first mask is necessary when the object has broad positional tolerances. If the angular or rotational position of the rotationally symmetrical objects is undetermined on introduction to the identification device, the second mask will conveniently be annular in form. With an approximate indication of the angular position, however, a rectangular or ciruclar disc-shaped mask covering the expected position of the angular-position symbol can also be produced.

This further development of the method according to the invention can be used to particular advantage for the identification of kegs and barrels in firms in the beverage industry, and in particular in breweries. In this case each keg receives a coding legible to humans which contains, among other things, a number for the filling operation and the keg itself. During filling, when the method according to the invention is used, it is possible to assign, by means of a data-processing unit on the entry and departure of the kegs, the destination address and the address of origin, so that keg losses can be attributed to individual customers. Furthermore, on the entry of the kegs it is possible to segregate those which must be subjected to a reliability test.

Methods have indeed been disclosed for coding kegs and barrels which make use of a punched code on the periphery of the base ring of the keg or on a metal tag on the upper side of the keg, which is read by optical sensors. The disadvantage of this method is that the keg must be rotated for the symbol to be read, or else the code is not readable by humans.

According to another further development of the invention, before the production of the masks for the orientational symbol, the point of concentration or center of mass of the area of the code field comprising the coding is determined. This further development can be used in those cases in which, apart from the coding and the orientational symbols, no other optical symbols are provided for locating the code field on the objects or are visible. The point of concentration of the surface will in this case vary slightly with the statistical distribution of the individual symbols. This variation, however, lies within tolerances which are smaller than the clearance between the orientational symbols and the masks for the orientational symbols. Through this a subseqent identification of the orientational symbols becomes possible.

In a further embodiment of the method according to the invention, it is assumed that the conveyor device does not deliver the objects to the identification device sufficiently precisely for identification of the coding to be possible, but precisely enough for the orientation symbols to come to lie within given masks.

Another further development of the method according to the invention consists in producing, after the determination of the point of concentration of the surface, an annular mask for the orientation symbols, the centre point of the mask being formed by the point of concentration of the surface. In this way an identification of the orientation symbols and thus of the code field and the position of the individual code symbols is also made possible when the swivelling position of the code field is not previously determined.

One particular embodiment of this further development is characterized in that a plurality of orientation symbols is disposed at different distances from the point of concentration of the surafce and that a plurality of masks for the orientation symbols is produced with different distances from the point of concentration of the surface, at least the first mask being annular and concentric in relation to the point of concentration of the surface.

Further advantageous developments and improvement to the method described in the main claim are possible through the measures enumerated in the dependent claims. Moreover, arrangements for the implementation of the method according to the invention are given in the dependent claims.

BRIEF DESCRIPTION OF THE DRAWINGS

Embodiments of the invention are shown in the drawing by means of several figures and explained in greater detail in the following specification.

The figures show the following details.

Similar parts are labelled with similar reference numbers in the figures.

DETAILED DESCRIPTION OF PREFERRED EMBODIMENTS

Figure 1:
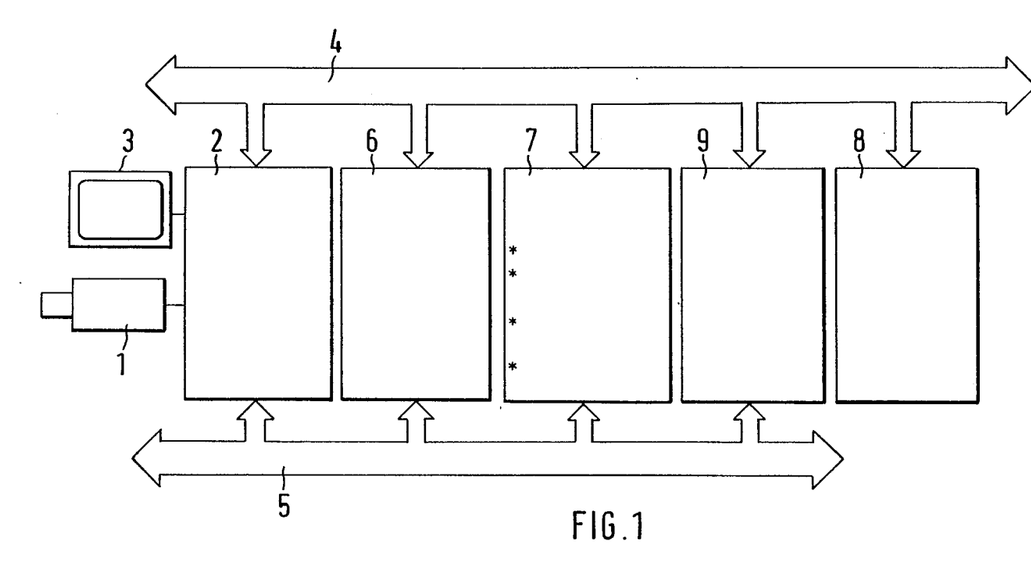
FIG. 1. an arrangement for implementing the method according to the invention.

FIG. 1 shows a block circuit diagram of an arrangement for the implementation of the method according to the invention. Here an electronic camera 1 records the image of the object to be identified or the relevant parts of it. The camera 1 may be a conventional video camera with a camera tube or with a semi-conductor surface sensor, or also a so-called line camera. The output signals of the camera 1 are transmitted to a camera interface 2, which prepares the video signals for further processing. This is done in the first instance by a binarization of the video signals, in order to obtain from the multiplicity of grey values recorded by the camera a binary signal which can accept only two states, depending on the presence of the symbol to be identified. The threshold used during binarization can be adjusted according to the contrast of the images recorded. These techniques are in themselves known and do not need to be explained in greater detail in connection with the present invention. The reproduction of the video signal or of the binary video signal by means of a monitor 3 is also known, as is the superimposed representation of the two signals.

The camera interface 2 is now connected firstly by way of an address, data and control bus 4 and secondly by way of a video bus 5 with other component groups of the arrangement as in FIG. 1. The component group 6 comprises a real-time grey value analyser with mask generator. By means of this unit the grey value of the special grey-value determination symbol scanned by means of the camera 1 is determined and the binarization threshold and, if necessary, an autmotic lighting system of the camera 1 are appropriately regulated. A mask generator contained in the unit 6 produces a mask with which the evaluation can be confined from the outset to adjustable areas of the image. Circuits and methods of this kind are also basically of the prior art and do not need to be explained in greater detail in connection with the present invention.

The next group of components 7 comprises an image-processing unit with various duties. For instance, surface measurements, determinations of points of concentration or center of mass of the symbols and edge detection can be undertaken and masks produced with the image-processing unit 7.

A processor unit contains a micro-processor and programme storage for controlling the course of the process.

Various image-processing stages can be more conveniently carried out if the image to be recorded is available over a plurality of image periods. This can be ensured on the one hand by holding the object to be identified for an appropriately long interval before the camera 1, or, if this is not possible or not expedient, placing the image, once recorded, in an image storage 9.

Figure 2:
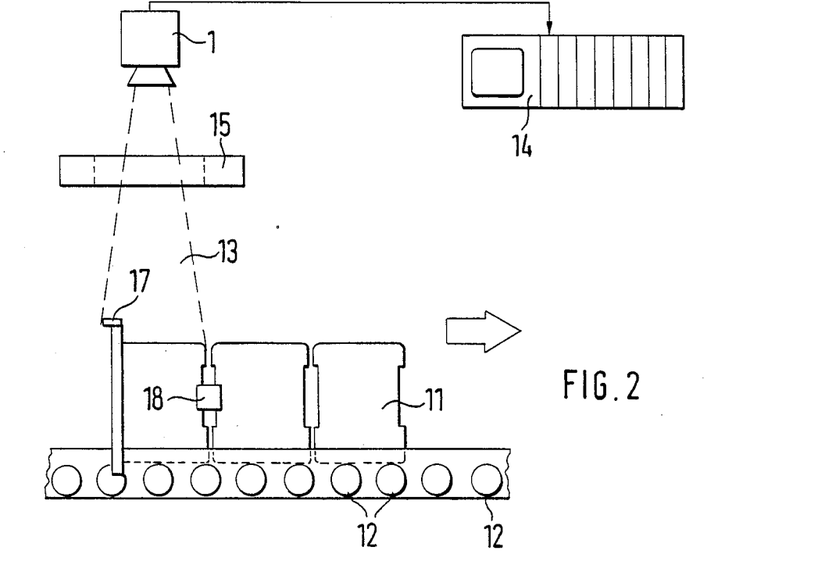
FIGS. 2 and 3: an arrangement for identifying kegs.
Figure 3:
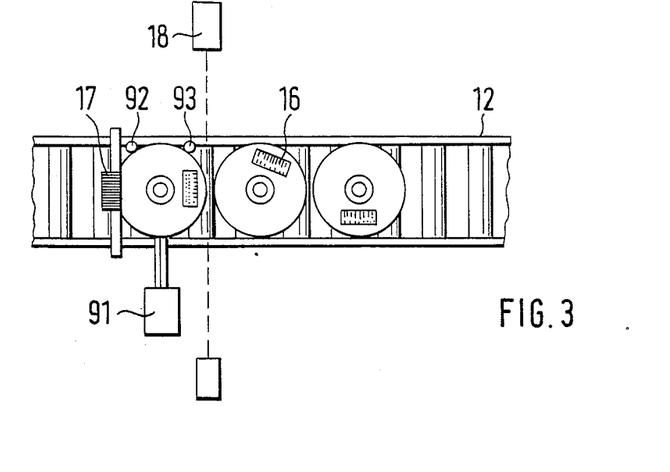

FIG. 2 shows schematically an arrangement for the identification of kegs 11, which are passed on a roller conveyor 12 through the visual field 13 of a camera 1. FIG. 3 shows the same arrangement viewed from above. The camera 1 is connected to an image-processing computer 14, as was shown in FIG. 1. An annular lamp 15 illuminates the visual field 13 of the camera 1. Codings 16 are applied to the upper surface of the keg 11, and these are read by means of the camera 1 and the image-processing computer 14. A light barrier 18 releases the brief holding of the keg in a three-point positioning unit, comprising a movable pressure cylinder 91 and two fixed roller supports 92, 93 and thus initiates the identification process. A fixed grey value scale 17 or a uniformly coloured grey value surface can also be evaluated by the image-processing computer, in order to have a reference standard for the illumination intensity on evaluation of the coding 16.

Figure 4:
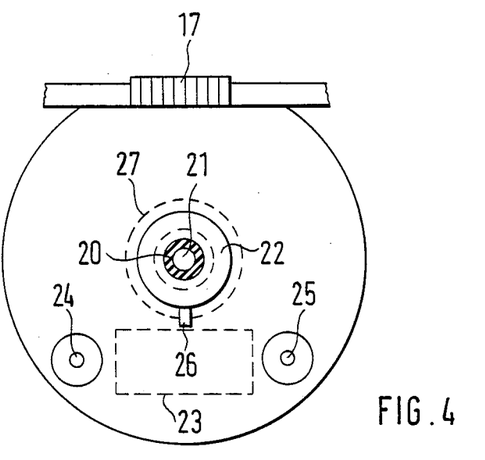
FIG. 4: the upper side of a keg with a coding according to the invention.

FIG. 4 gives an enlarged representation of the upper side of the keg and the grey-value scale 17. By means of the roller conveyor 12 and the positioning unit 91, 92, 93 a precise positioning of the keg is obtained such that the centre point of the keg deviates from the theoretical position by only a few millimetres.

If necessary, for an even more precise determination of the centre-point the image of the high-grade steel fittings can be used for a first position identification before the evaluation of the orientation symbol by using the black valve rubber 20 as an orientation mark, or, when a covering hood is used on the fitting, applying a similar marking or a point centrally on the hood and using these for an initial position identification. A mask in the shape of a circular disc, which is concentric with the theoretical position of the central point of the keg, is produced for this purpose inside the image-processing computer.

The radius of the mask is greater than the outside diameter of the black valve rubber on the marking on the covering hood, but smaller than the diameter of the fittings 22. In this way it is assured that only the valve rubber or the marking appears as a dark region before the otherwise light-coloured surface of the fittings or protective cap. A calculation of the point of concentration or center of mass of the dark region gives the precise position of the central point of the keg.

Figure 5:
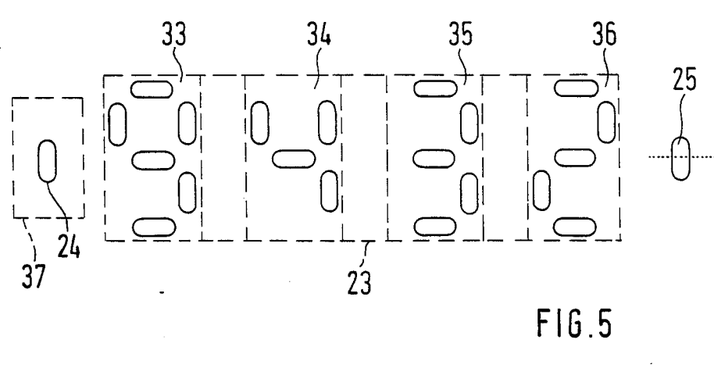
FIG. 5: a coding according to the invention.

For the identification of the keg a coding field 23 is disposed on the upper side of it, bearing a coding explained in greater detail in association with FIG. 5. Two orientation symbols 24, 25 are disposed beside the coding field 23. A further orientation symbol 26 is disposed between the central point of the keg and the coding field 23. The symbols may be light against a dark background or dark against a light background.

Since the kegs are not fixed as regards their rotational position, the rotational position is first determined. For this purpose an annular mask 27 is produced. Parts of the image which lie within the mask 27 are identified as rotational position orientation symbols 26, if they have a series of cohesive pixels which contrast with the background and the number of them corresponds to the width of the rotational position orientation symbol. For rotational position identification itself it is possible, for example, to use a point-evaluating method as follows:

Here the angular position of each circular pixel is collated in a table, beginning with the first pixel and ending with the last pixel of the complete circle. The pixels of the circle are then scanned in succession. If the aforementioned series of pixels is covered, then the middle pixel or the two middle pixels of the series are evaluated as characteristic of the rotational position by reading the associated angular position from the table. The accuracy of rotational position identification, however, is restricted on account of tolerances which exist.

However, after the rotational position and the centre-point of the keg are at least approximately established, the expected position of the orientation symbols 24 and 25 is calculated in the image-processing computer 14. In order, however, to determined the precise position, two masks are produced about the expected positions, the diameters of which are sufficiently large to be able to compensate for inaccuracies in the previous process stages. The masks 30 and 31, however, should also not be too large, so that, for example, the coding field 23 does not fall within the mask and thus lead to an incorrect measurement. In practice a radius of the mask 30 or 31 which corresponds to half the distance between the central point of the orientation symbol 24, 25 and the coding field 23 has been found to be satisfactory.

The surface point of concentration of the orientation symbols 24 and 25 is then determined by known methods of image processing. Since the orientation symbols 24 and 25 have a predetermined position in relation to the coding field 23, the precise position of the coding field 23 is thus also determined.

The further stages of the method are explained with reference to FIG. 5. The coding field 23 comprises, for example, four character symbols 33, 34, 35, 36 which are represented by means of a selection of seven segments. In this way the character symbols are designed to be both readable by humans and, for more reliable identification, interpretable by an image-processing computer. As compared with the representation in FIG. 4, in FIG. 5 the orientation symbols 24, 25 are elongated and thus adapted to the type of segments of the character symbols. It is shown by the rectangular mask 37 that instead of the round mask as in FIG. 4 rectangular ones may also be used. Further masks, which are produced successively at the positions of the present and absent segments, are used to determine or establish which segments are present. The information obtained in this way is finally transformed into signals which are characterized by known means as character symbols, for example by the ASCII code.

The process stages described in association with FIGS. 2 to 5 are input as a programme into the image-processing computer 14. This programme may be of different form depending on the computers used and further details within the specialized field. For this reason, the most important programme stages in the following enumeration are given verbally.

* Wait for a light-barrier signal in each case to record the presence of the next keg at the station. The embodiment relates to a code-field with a ten-digit, seven-segment number.

* Image recording and mask production for grey value analysis in a constant scanning mask; the mask encloses a grey-value reference area which is permanently installed at the edge of the image field. Grey value summation and adaptation of the binarization threshold to the sum of measured grey values to balance out fluctuations in the lighting.

* Image-recording with real-time storage of the binary image.

* Identification of the rotational position (rough identification) by means of the rotational position orientation symbol (26).

* Calculation of the expected central points M1', M2' of the fine orientation symbols (24, 25).

* Determination of the point of concentration within two masks in the form of circular discs with centres M', M2' and of radius r, r being about half the distance between the centre of the fine-orientation symbol and the code field. The surface points of concentration obtained correspond to the actual centre-points M1, M2 of the fine-orientation symbols (24, 25).

* Calculation of the segment centre-points MS of the 70 segments from the positional information of M1 and M2 by means of coordinate transformation.

* Rapid scanning of the segments by circular disc mask with diameter D and centre MS, D corresponding to approximately one and a half times the width of a segment (overlapping scanning).

Formation of the sum of pixels within each circular disc mask. (The pixel addresses of the circular disc masks are obtained by indexing the centre-point address of the segment in each case with a permanently stored circular disc table.)

* Storage of all pixel sums S i, j, where i=index for the digit i (i=1 ... 10), j=index for the segment number (j=1 ... 7).

* Formation of 10 flag bytes FB i, each with 7 significant bits j, where: bit j of the byte i is equal to 1 if S i,j is greater than Sg; bit j of the byte i is equal to 0 if S i,j is less than or equal to Sg, Sg corresponding to a limit value for the pixel sum S i,j of the order of about one quarter of the pixel sum of a segment area.

Bit 8 of the byte is always 0.

* Comparison of the flag bytes obtained with 10 reference bytes for the digits Z0 ... Z9.

In the case of a positive comparison, the associated ASCII symbol is taken from the reference list and incorporated into an output table written in the sequence Z0 ... Z9.

* Output of the ASCII symbols by way of a serial interface.

Figure 6:
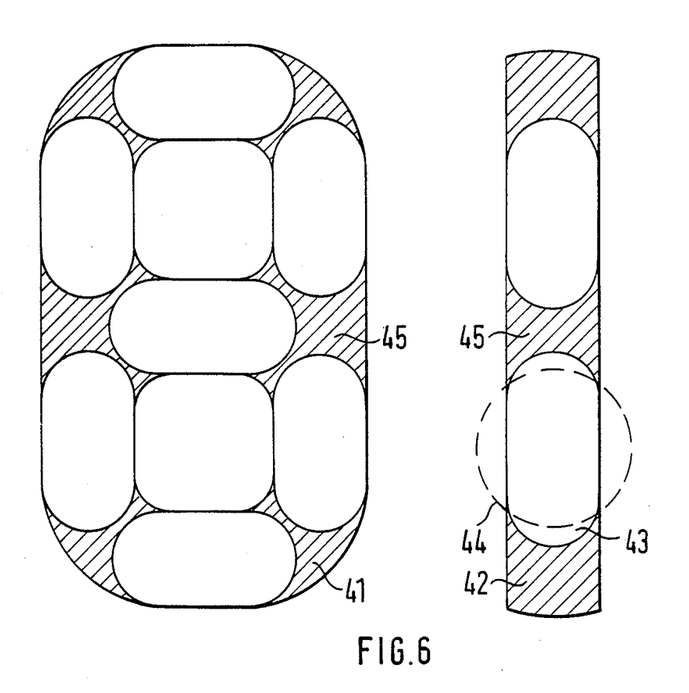
FIG. 6: a schematic representation of the scanning of a symbol with a mask.

In FIG. 6 two character symbols 41, 42 are shown, one segment 43 of the character symbol 42 being scanned with a mask 44. The mask 44 is in the shape of a circular disc and covers the greater part of the segment 43. Through the formation of the pixel sum made in the programme described above and the determination of whether the pixel sum lies above a given limit value, inaccuracies with regard to the position of the mask 44 in relation to the segment 43 or of the segment 43 itself (too wide or too narrow) are balanced out.

FIG. 6 also shows that for better legibility of the symbols by humans, the segments forming a symbol can also be joined together or supplemented to complete symbols. The areas 45 cross-hatched in FIG. 6 are not covered by the image-processing computer 14 during evaluation.

Figure 7:
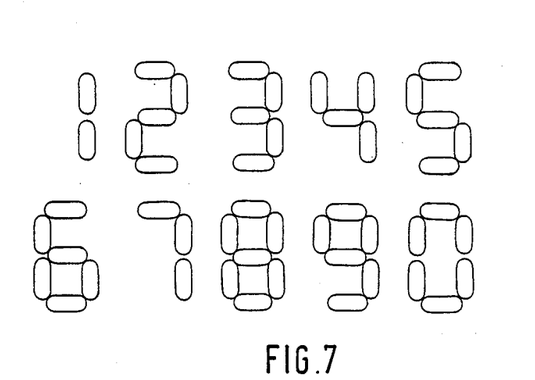
FIG. 7: numerical symbols for use in the method according to the invention.

In FIG. 7, for the sake of completeness, all ten numerical character symbols are shown.

Figure 8:
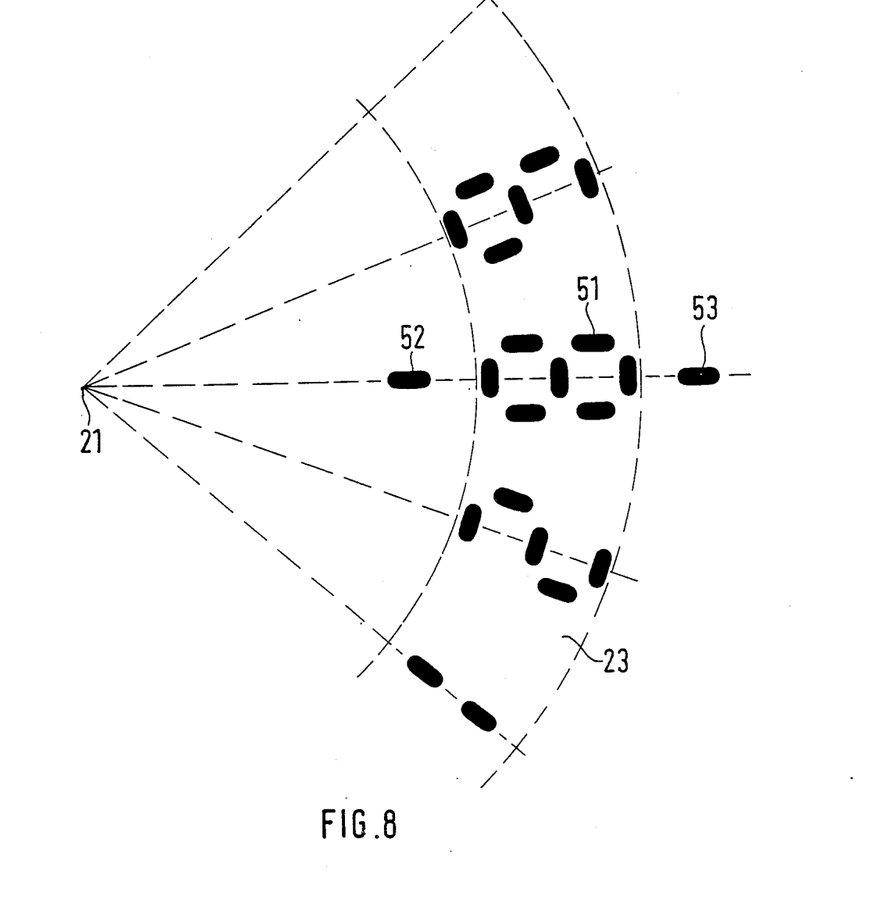
FIG. 8: a radially and eccentrically arranged coding for cylindrical objects.

Should it now be more expedient, for manufacturing or other reasons, the coding field may also be annular in shape, as is shown in FIG. 8. In this case orientation symbols 52, 53 can be assigned to a symbol 51.

Figure 9:
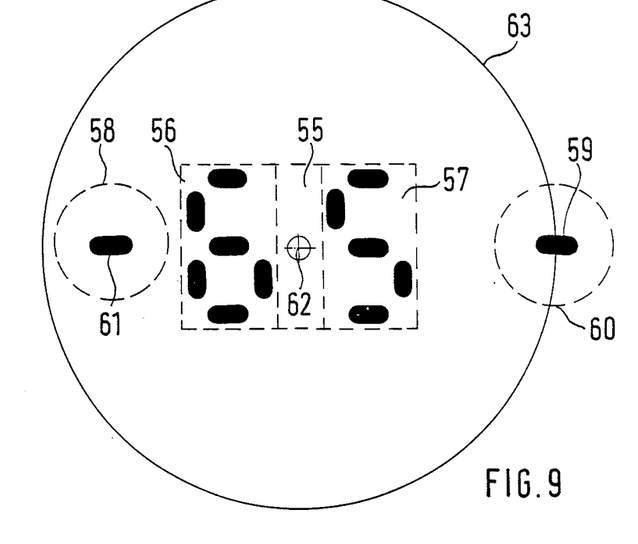
FIG. 9: a centrally arranged coding field with orientation symbols for cylindrical objects.

In that embodiment of the method according to the invention which was explained in connection with FIGS. 2 to 5 the central point of the keg can be positioned with relatively high accuracy within the visual field of the camera. If such a point should not be obtained on application of the method according to the invention, another embodiment of the method can be applied which is explained in greater detail with reference to FIG. 9. In this case it is assumed that the object to be identified can be brought into the visual field of the camera in such a way that, apart from the symbols shown in FIG. 9, no further symbols appear in the camera image.

A coding field 55 contains, for example, two character symbols 56 and 57. In addition, two orientation symbols 59 and 61 are provided. After the object is brought into the visual field of the camera, the approximate area point of concentration 62 is determined by the image-processing computer, taking into account all symbols shown in FIG. 9. About this point an annular mask 63 is produced, the mean radius of which corresponds to the distance between the area point of concentration and the middle of the orientation symbol 59. In this way the position of the orientation symbol 59, and thus also the approximate rotational position of the coding field 55, can be determined. By further, for example circular disc-shaped, masks 58, 60 the precise position of the orientation symbols 59 and 61 can be determined, from which deductions can again be made regarding the precise position of the coding field 55 and the character symbols 56 and 57.

Should the rotational position, however, be approximately known, it is possible, after the determination of the area point of concentration 62, also to determine masks for the orientation symbols, as described with reference to FIG. 4.

Figure 10:
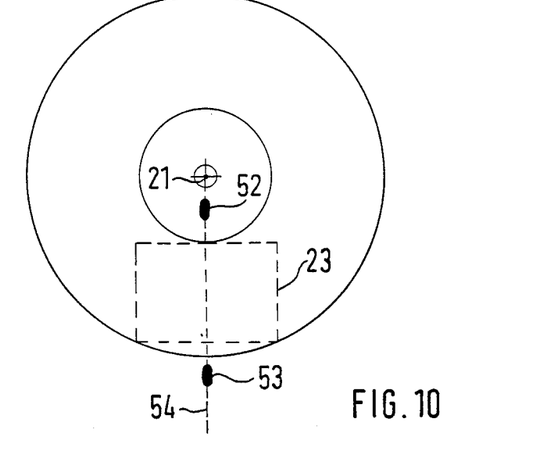
FIG. 10: an eccentric arrangement of a coding field with orientation symbols for cylindrical objects with two possible positions for swivelling-point orientation.

FIG. 10 shows an alternative to the arrangement of the orientation symbols as in FIG. 4. The coding field 23, as in FIG. 4, is disposed on an imaginary annulus 50 about the axis of rotation 21 of the piece or transport means. The orientation symbols 52 and 53 are disposed on the same radius 54 and serve as both orientation symbols for the rotational position and also to determine the precise position of the coding field.

Figure 11:
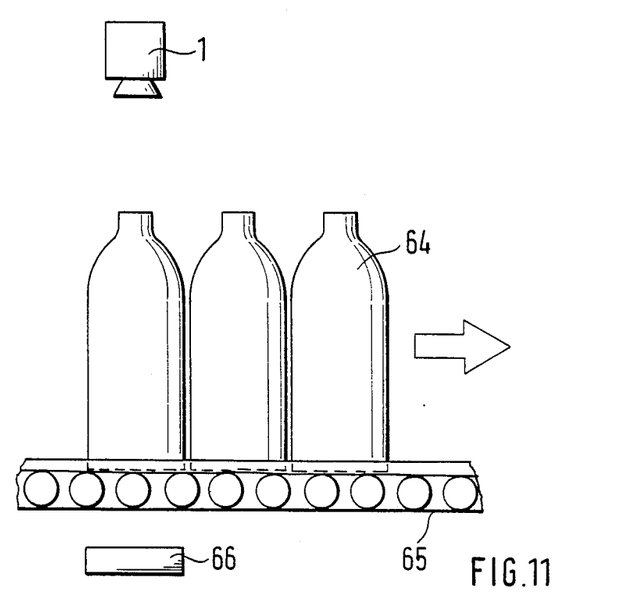
FIG. 11 and FIG. 12: a device for identifying bottles.
Figure 12:
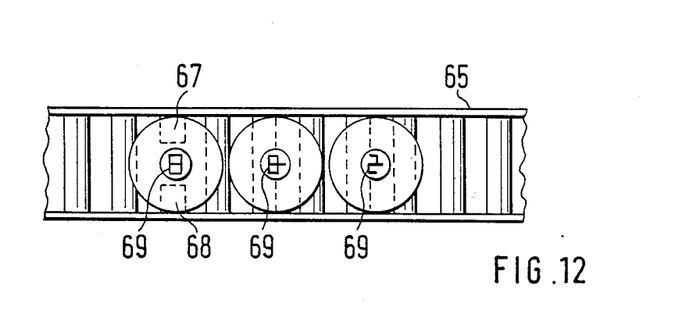

A further arrangement of the method according to the invention is explained with reference to FIGS. 11 and 12. In this case symbols 69 which are imprinted in the bottoms of bottles are to be identified. For this purpose the bottles 64 are passed on a roller conveyor 65 through the visual field of the camera 1. An illumination device 66 illuminates the bottles from below. The illuminating device may operate in flashes, which, with the continuous movement of the bottles 64 contributes to an image which is free of blurriness due to movement. The corresponding image signal, as described with reference to FIG. 1, can be stored for evaluation. The rollers 67 and 68 of the roller conveyor 65 allow the passage of light. The identification process may take place as described with reference to FIG. 9.

Figure 13:
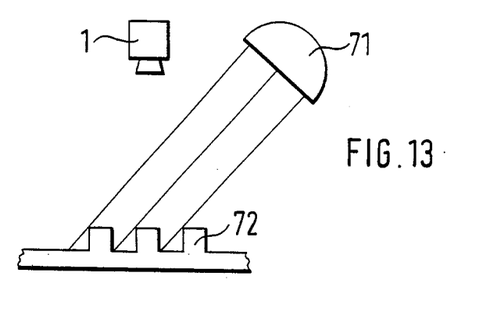
FIG. 13 and FIG. 14: an arrangement of code symbols with raised application of the symbols.
Figure 14:
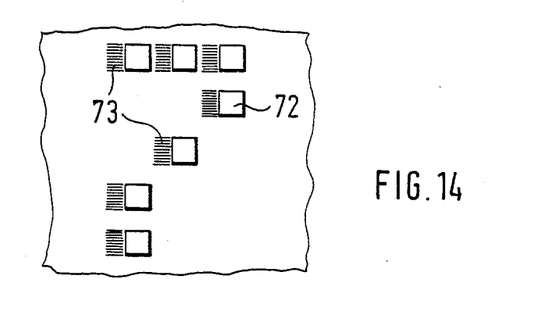

In the case of objects which are exposed to rough treatment, special precautions should be taken, so that the coding is durable and has an adequate contrast. Printed stick-on labels are therefore often unsuitable. One possibility of durable coding is shown in FIGS. 13 and 14. In this case the segments of the character symbols are represented by a raised formation of the surface of the object. Raised markings of this kind can readily be produced in the case of objects made of extruded plastics. The light source 71 is so arranged that the raised symbols 72 cast shadows 73, so that a sufficient contrast is produced between the illuminated surfaces, which are not shaded from the light source by adjacent segments and the areas shaded by existing segments.

Figure 15:
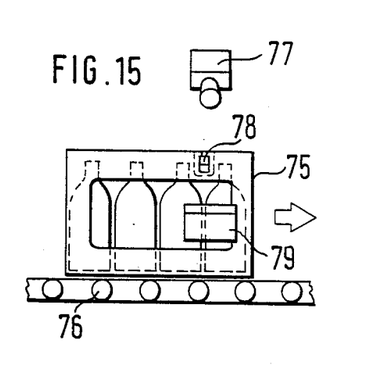
FIG. 15 and FIG. 16: a device for identifying bottle crates.
Figure 16:
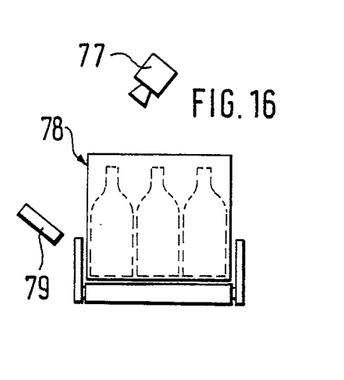

A further possibility of assuring a high contrast lies in providing the coding in the form of perforations in the walls of the objects. FIGS. 15 and 16 show a device for identifying bottle crates 75 which are passed on a roller conveyor 76 into the visual field of an obliquely positioned camera 77. The camera "sees" through the coding which is in the form of perforations 78 an illuminated or self-illuminating surface 79. The distortion of the coding caused by the oblique positioning of the camera can immediately be corrected by appropriate programming of the image-processing computer 14 (FIG. 1).

Figure 17:
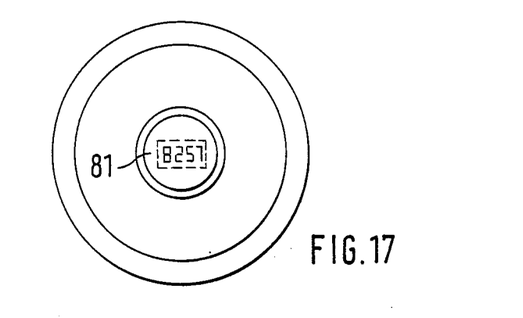
FIG. 17, FIG. 18 and FIG. 19: arrangements of codings on kegs.
Figure 18:
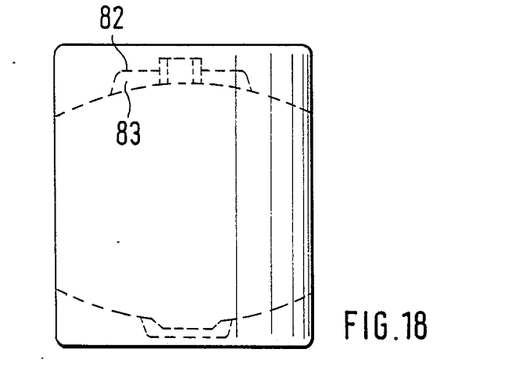
Figure 19:
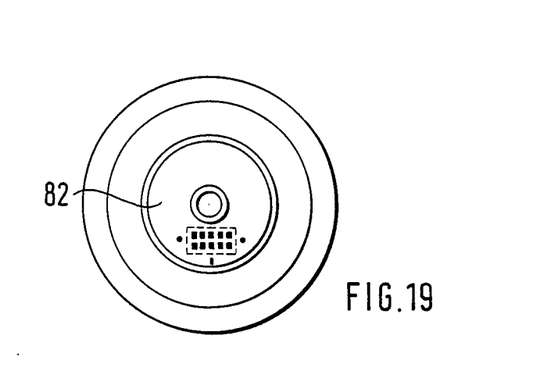

FIGS. 17 to 19 show various possibilities of arranging the coding on a keg made entirely of metal. While in the arrangement shown in FIG. 17 the coding is provided on a round area 81 disposed in the middle of the lower side, according to FIGS. 18 and 19, which in each case show the same arrangement in different views a metal disc 82 is welded on the upper side of the keg vent 84 about the filling connection. The disc is also conveniently welded to the filling connection, so that a sealed intermediate space 83 is produced between the keg vent and the disc. In the upper side of the disc, which is advantageoulsy made smooth and horizontal, code symbols and orientation symbols are imprinted by a stamping process. A filling of the space between the vent and the disc with foam plastic, preferably black urethane, provides the necessary contrast, so that the stamped symbols stand out dark against the light-coloured metal surface of the disc.

Instead of the disc, rectangular tags or formed sheet-metal pieces can be used which are disposed on a defined imaginary annulus about the keg roll axis so that the longitudinal sides of the tag or the formed piece run tangentially to imaginary annuli about the axis of rotation of the keg.

Since the surface of the keg vent is curved bidimensionally, three methods can be used to fit and secure the tag or the box: (1) the tag is also bidimensionally shaped—for example by a pressing process before or after coding—and fits to the surface of the keg. The resulting perspective distortions of the tag image must then, under certain circumstances, be evened out by the image-processing computer.

(2) The tag is fitted with a thick layer of adhesive or plastic, and the surface of the tag remains smooth. The tag is preferably mounted on adhesive or plastic so that its surface remains horizontal.

(3) The sheet-metal piece is in the form of a sheet-metal box open at the bottom, the free lower edges of the side walls being shaped so that they fit the surface of the keg and can be welded to it. The upper side of the box, which bears the code information, should lie horizontally. The box can be filled with foam plastic as in the case of the disc shown in FIGS. 18 and 19.

For subsequent application it is more convenient for the sheet-metal piece to be provided with a fork-shaped extension which is placed round the collar and welded to it.

A further advantageous application of the method according to the invention is obtained in association with the coding of plastic-wrapped objects, such as the familiar beer casks or kegs surrounded with foam plastic.

The segmented structure of the code symbols and the orientation symbols makes it possible to imbed the symbols in the form of bars or cylinders of a few millimetres in height in the form of geometrical insular regions in the polyurethane covering, so that they are surrounded by plastic and their surface forms a plane surface with the covering of the keg. In this way a unity of object and coding is achieved which is broken up only with difficulty. At the same time the segments can easily be into the polyurethane, for example by means of a programmed automatic handling device.

A method of introducing the segments into a tag has already been disclosed, in which the tag is in the form of a white sprayed die casting and in which the character segments are all present in the original state, but are provided with theoretical breaking points. A programmed ejector then removes each of the unrequired segments in order to create a specific character. The orientation symbols according to the invention are also firmly applied to the tag. On surrounding the keg with plastic foam, the tag is also imbedded in the foam, the segments not removed and the orientation symbols forming a plane surface with the surface of the keg. The points at which segments were removed are covered by polyurethane foam.

One method according to the invention for producing and applying the code symbols and the orientation symbols relates to the application of the symbols to a particularly shaped plate, for example by means of a stamping process, and the imbedding of the plate in the polyurethane covering.

Figure 23:
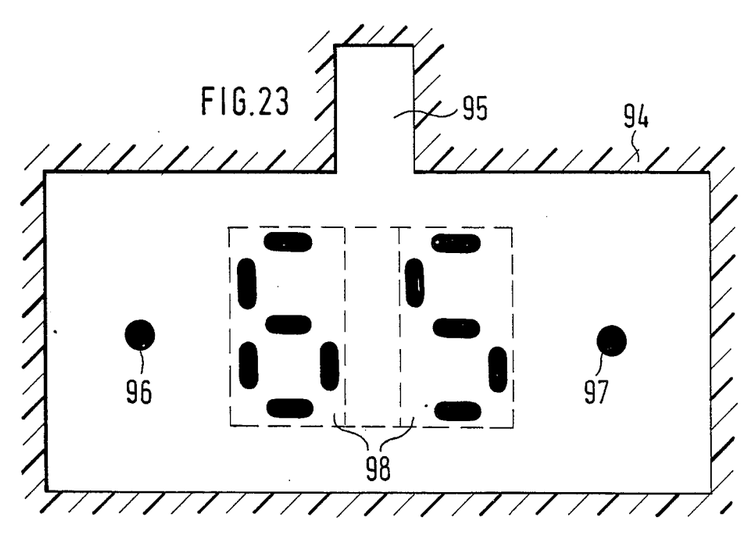
FIG. 23: a tag with a coding, orientation symbol and a further orientation symbol.

The following explanation relates to FIG. 23. In this case a metal or plastic plate 94 is used which may be stamped out of a plane sheet of the material in question or may be a formed part.

The plate is in the shape of a rectangle or oval which has on one side a rotational position orientation symbol in the form of a rectangular recess 95.

The fine-orientation symbols 96, 97 and the character segments 98 are produced by a material-removing process, for example by stamping, so that they appear as perforations in the plate 94. When the cask is surrounded by foam plastic the plate is also enclosed in the plastic, so that it forms one smooth, plane surface with the surface of the foam-coated cask and the perforations 96, 97, 98 made in the plate 94 are filled with the foamed plastic. For this purpose the plate is placed in a positioning recess of the foamed plastic mould before the foam-coating process. It may, however, also be applied even in the metal-machining process of the manufacture of the cask in the form of a formed part, for example welded to the metal surface, so that a better anchoring with the cask itself is obtained.

To produce as high a contrast as possible, the plate 94 is made, for example of white plastic or polished high-grade steel, if the plastic covering of the object—as is usual in the case of coated kegs—is dark brown or black (shown by cross-hatching in FIG. 23).

A special characteristic for image-processing results if a plurality of the designations described is used on the casks of a single brewery and one reading apparatus is intended to evaluate all types of labelling occurring.

The geometrical form and assignment of the orientation symbols and code symbols and the number and geometry of the code symbols are in this case assumed to be identical.

A distinction must then be made between the types of image appearing:

Case A:

All symbols appear light against a dark background (e.g. white plastic symbols in the black, foam-covered cask).

Case B:

All symbols appear black against a light-coloured background (e.g. stamping of the symbols in a light-coloured metal disc with subsequent application of black polyurethane beneath the disc).

Case C:

The rotational orientation symbol appears light-coloured and the other symbols appear dark against an opposite background in each case (embodiment as in FIG. 23).

According to a further development of the invention provision is therefore made for a circular disc-shaped mask to be formed before the actual code identification of the image-processing computer, this mask covering as large an area of the cask surface as possible. Within the mask the sum of the white image points in the binary image or the sum of the grey values is obtained and from this the information as to whether the keg in question is metal or plastic-coated is derived.

If it is a metal keg, the following image-processing procedures are effected in inverted binary images, in which all light-coloured points of the image are shown as dark and all dark image points as light.

Through this a different use of the algorithms already mentioned, even in the case of dark symbols against a light-coloured background, is made possible.

If the keg in question is (black) foam-covered, the identification of the rotational position identifying symbol is effected in an uninverted binary image.

After the determination of the rotational position according to the procedures described, the image-processing computer forms a mask which covers the entire code field and calculates the sum of the white image points in the binary image or the sum of the grey values.

By means of the values obtained it is possible to distinguish between case A and case C, since considerable differences will occur according to the background brightness.

If case C is recorded, the binary image is inverted. In case A the binary image is not inverted. After this, the procedures already described are followed.

The arrangements for coding illustrated by the example of a keg and a bottle crate are also suitable for other transport means and objects. For example, car bodies may be provided with labelling of this kind at a point not subsequently visible in the form of a perforated metal plate and pass through the manufacturing line, including the lacquering station. In this case, even after lacquering the lacquer will not completely cover the the perforations formed by the symbol, so that the coding even then remains legible, for example in counter-light. Unlike perforation codings of the prior art, legibility by humans is also assured by the coding according to the invention.

Figure 20:
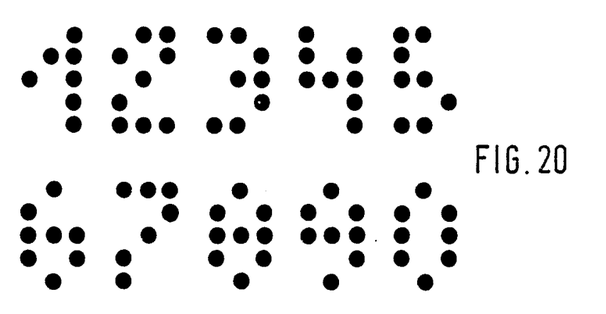
FIG. 20, FIG. 21 and FIG. 22: various codings which can be used in the method according to the invention.
Figure 21:
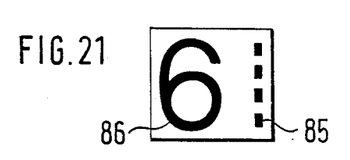
Figure 22:
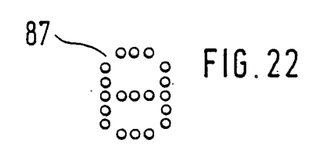

FIGS. 20 to 22 show further advantageous forms of the coding In FIG. 20, for example, a coding of the character symbols by a 3×5-point matrix is shown. This coding may be used to advantage, for example, in the coding of electronic printed circuit boards. For this purpose the corresponding points are bored as perforations in the printed circuit board and can be read against the light both by the human eye and by a camera with an image-processing computer. Compared with the known punched codes for printed circuit boards, a slightly greater area is needed. The coding, however, offers the advantage that all letters of the alphabet can be represented.

The printed circuit board is preferably introduced into the reading device with one of its edges against a reference edge. The camera detects the code perforations counter-light, an illuminating surface being disposed beneath the camera. The camera is fitted with a telephoto lens and disposed some distance away, in order to restrict the optical contraction of the code points due to the perspective ovalization of the circular perforations at the edge of the image field. The printed circuit board may also be disposed in a telecentric beam path. If the edge of the printed circuit board is not parallel to the perforation scanner, the angular position of the printed circuit board can be roughly determined by means of the centering perforations usually incorporated using known methods of image processing. To determine the position of the coding field in the direction of the abscissa and ordinate one perforation or one row of perforations at the beginning and end of the code field, which are displaced from the field by about one symbol can be used.

A further application of the method according to the invention makes it possible to arrange symbols readable by humans and special symbols provided for automatic identification together on one stamping die, for example for the production of figure stamps. An example of a labelling produced in this way is shown in FIG. 21. When symbols of this kind are identified by the method according to the invention, the mask which scans the individual segments is produced only at the positions of the machine-readable coding 85, and not in the region of the humanly readable symbol 86. Finally, a further example is shown in FIG. 22 of the representation of the symbol 87 by means of a 5×7-point matrix.

A further embodiment of the invention relates to the application and evaluation of additional grey-value determination-symbols in the code field region.

The grey-value determination symbols are used, in the event of varying qualities of the printing of the symbol, low contrast and different illumination intensities, to find an optimal threshold for the video signal binarization.

This is necessary in particular in the case of critical printing processes which produce only a slight contrast with the background, for example the etching of symbols on metallic surfaces or laser printing on metal or colour-spray labelling of porous surfaces. Even if the background, etc. may vary, however, the use of the method described below is advantageous for reliable symbol identification.

In this case, an area, for example rectangular or disc-shaped, is labelled at a fixed place in the immediate vicinity of the code symbols by the same method as the other symbols, and advantageoulsy simultaneously with these and continuously.

At another fixed point in the immediate vicinity of the code symbols an area of equal size and geometrically similar—referred to subsequently as the "blank symbol"—is kept clear of any kind of symbol, so that it represents the surface quality of the unlabelled code field background.

The grey-value determination symbol and the blank symbol are conveniently of the size of a code symbol space or even larger.

After the location identification of the code field by the method according to the invention has been completed—on the basis of the binarization threshold and the preceding code reading in each case—an at least rough determination of the position of the grey-value determination symbol and of the blank symbol is possible.

Disc-shaped or rectangular masks are now placed centrally inside the two symbols, these being so small in relation to the symbols that, even in the event of inaccuracies in the preceding position determination, they are always completely surrounded by the symbol contours and do not overlap these.

The grey-value sum of the pixel is now determined inside the masks in the unit 6.

Depending on the two grey-value sums determined—one showing the grey value of the printed and the other the grey value of the unprinted points of the code field—an adaptation to the binarization threshold is then effected in such a way that the threshold is placed approximately midway between the two grey values determined.

With this adapted threshold the location identification can then be repeated by means of the orientation symbol, which will, as a rule, lead to a higher degree of accuracy, and the code symbols can be scanned by the method according to the invention.

In the case of specific labelling methods, for example etching on metal, even considerable differences in the contrast from symbol to symbol are possible. For this reason a contrast determination for this is necessary in the case of each individual symbol. As a rule in this case the position of the symbols is not variable, so that no position identification has to be made. Furthermore, the background always has a uniform brightness value.

For this and similar uses the application of a grey-value determination symbol immediately beside or above or below each symbol is useful. In this case grey-value determination symbol may be relatively small and even overlapped by the mask for grey-value determination, since the grey value of the background is defined and can be mathematically subtracted after the sum of the grey values is obtained. In this arrangement, however, it must be ensured that the area of the grey-value determination symbol—and only this—is fully covered by the mask.

I claim:

1. A method of identifying an object having permanently applied thereto an identifying coding comprising segmented character symbols readable both by humans and machines and orientation symbols having a predetermined position relative to said identifying coding, said method comprising the steps of:
    (a) scanning said object with applied identifying coding and orientation symbols with an electronic camera to produce an electronic output signal;
    (b) feeding said output signal to an image-processing computer which determines an expected position for said orientation symbols and produces an orientation symbol scanning pattern which includes the expected position of the orientation symbols and has an area which exceeds the area covered by the orientation symbols;
    (c) scanning segments of said orientation symbol scanning pattern with said electronic camera to identify a precise coordinate position for said orientation symbols;
    (d) determining a coordinate position for said identifying coding from the coordinate position of the orientation symbols and the predetermined position of the orientation symbols relative to said identifying coding, and producing an image segment scanning pattern covering the position of said identifying coding;
    (e) scanning segments of said image segment scanning pattern with said electronic camera to determine the presence or absence of image segments; and
    (f) deriving identifying information for said character symbols from the presence or absence of image segments in the scanned segments of said image segment scanning pattern.

2. A method according to claim 1, wherein said object is a rotationally symmetrical object and a rotational position indicating symbol is applied to said object at a predetermined radial distance from the center of symmetry of said object, and wherein step a) of said method comprises:
    producing an annular scanning pattern having a center which substantially coincides with said center of symmetry, an inner radius less than said predetermined radial distance and an outer radius greater than said predetermined radial distance; and
    scanning said annular scanning pattern with said electronic camera to determine the rotational orientation of said object.

3. A method according to claim 2, wherein, prior to production of said annular scanning pattern, an object center scanning pattern is produced and scanned with said electronic camera to determine a coordinate position for the center of said rotationally symmetrical object.

4. A method according to claim 1, wherein grey-value determination symbols are additionally applied to said object in a field scanned by said electronic camera to facilitate a determination of contrast between image segments of said identifying coding and orientation symbols and background areas of said object, said grey-value determination symbols having a predetermined position in relation to said orientation symbols.

5. A method of identifying an object having permanently applied thereto an identifying coding comprising segmented character symbols readable both by humans and machines and orientation symbols having a predetermined position relative to said identifying coding, said method comprising the steps of:
(a) scanning said object with applied identifying coding and orientation symbols with an electronic camera to produce an electronic output signal;
(b) feeding said output signal to an image-processing computer which determines an expected position for said orientation symbols and produces an orientation symbol scanning pattern which includes the expected position of the orientation symbols and has an area which exceeds the area covered by the orientation symbols;
(c) scanning segments of said orientation symbol scanning pattern with said electronic camera to identify a precise coordinate position for said orientation symbols;
(d) determining a coordinate position for said identifying coding from the coordinate position of the orientation symbols and the predetermined position of the orientation symbols relative to said identifying coding, and producing an image segment scanning pattern covering the position of said identifying coding;
(e) scanning segments of said image segment scanning pattern with said electronic camera to determine the presence or absence of image segments; and
(f) deriving identifying information for said character symbols from the presence or absence of image segments in the scanned segments of said image segment scanning pattern, and
wherein prior to production of said orientation symbol scanning pattern, the object is scanned to determine a center of mass of image segments of said identifying coding, and a coordinate position for said orientation symbol scanning pattern is determined from the coordinate position of said center of mass and a predetermined positional relationship between said center of mass and said orientation symbols.

6. A method according to claim 5, wherein a plurality of orientation symbols are disposed on said object at different distances from said center of mass of the image segments, and a plurality of orientation symbol scanning patterns is produced at different distances from said center of mass, at least one of said orientation symbol scanning patterns being annular and concentric with said center of mass.

7. A method of identifying an object having permanently applied thereto an identifying coding comprising segmented character symbols readable both by humans and machines and orientation symbols having a predetermined position relative to said identifying coding, said method comprising the steps of:
(a) scanning said object with applied identifying coding and orientation symbols with an electronic camera to produce an electronic output signal;
(b) feeding said output signal to an image-processing computer which determines an expected position for said orientation symbols and produces an orientation symbol scanning pattern which includes the expected position of the orientation symbols and has an area which exceeds the area covered by the orientation symbols;
(c) scanning segments of said orientation symbol scanning pattern with said electronic camera to identify a precise coordinate position for said orientation symbols;
(d) determining a coordinate position for said identifying coding from the coordinate position of the orientation symbols and the predetermined position of the orientation symbols relative to said identifying coding, and producing an image segment scanning pattern covering the position of said identifying coding;
(e) scanning segments of said image segment scanning pattern with said electronic camera to determine the presence or absence of image segments; and
(f) deriving identifying information for said character symbols from the presence or absence of image segments in the scanned segments of said image segment scanning pattern, and
wherein prior to step (a) said object is scanned over an area which is larger than the area of said identifying coding and orientation symbols and which includes said identifying coding and orientation symbols to determine the number of dark points and the number of light points within said scanned area, and the numbers of dark and light points are compared and the result used to control a signal inverter to adapt the camera to scanning of light-colored symbols on a dark background or dark-colored symbols on a light background.

8. A method according to claim 2, wherein after the rotational orientation of said object is determined, a further scanning pattern covering the area of said identifying coding is produced and scanned to determine the number of dark point and the number of light points within said area, and the numbers of dark and light points are compared and the result is used to control a signal inverter to obtain a consistent relationship between the identifying coding and said camera output signal.

* * * * *